(12) United States Patent
Takemura

(10) Patent No.: US 11,431,810 B2
(45) Date of Patent: Aug. 30, 2022

(54) NETWORK SYSTEM, COMMUNICATION CONTROL DEVICE, AND METHOD OF CONTROLLING COMMUNICATION

(71) Applicant: Kazumasa Takemura, Kanagawa (JP)

(72) Inventor: Kazumasa Takemura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 378 days.

(21) Appl. No.: 16/571,520

(22) Filed: Sep. 16, 2019

(65) Prior Publication Data

US 2020/0106839 A1 Apr. 2, 2020

(30) Foreign Application Priority Data

Sep. 27, 2018 (JP) .............................. JP2018-181653

(51) Int. Cl.
*H04L 12/28* (2006.01)
*H04L 67/51* (2022.01)
*H04L 67/56* (2022.01)

(52) U.S. Cl.
CPC .............. *H04L 67/16* (2013.01); *H04L 67/28* (2013.01)

(58) Field of Classification Search
CPC ....... H04L 45/64; H04L 63/083; H04L 67/16; H04L 67/28
(Continued)

(56) References Cited

U.S. PATENT DOCUMENTS

2011/0286359 A1* 11/2011 Shimonishi ............. H04L 45/02
370/254
2013/0223277 A1* 8/2013 DeCusatis ............. H04L 49/357
370/254

(Continued)

FOREIGN PATENT DOCUMENTS

JP 2015-114842 6/2015
JP 2018-523443 A 8/2018

(Continued)

OTHER PUBLICATIONS

Office Action dated Jun. 14, 2022 issued in corresponding Japanese Patent Application No. 2018-181653.

*Primary Examiner* — Thai D Hoang
(74) *Attorney, Agent, or Firm* — Harness, Dickey & Pierce, P.L.C.

(57) ABSTRACT

A network system includes a communication control device for controlling communication between communication terminals and information processing apparatuses on a communication network via first switches and second switches. The communication control device receives a response request from one communication terminal via one first switch, determines, based on communication path information associating transmission source information identifying the first switches and forwarding destination information identifying the second switches, one second switch identified by specific forwarding destination information associated with specific transmission source information identifying the one first switch, as a forwarding destination of the response request, and transfers the response request to the determined one second switch connected to one information processing apparatus. The one communication terminal, which has transmitted the response request to the communication network via the one first switch, receives a return response from the one information processing apparatus via the one second switch and the one first switch.

10 Claims, 12 Drawing Sheets

(58) Field of Classification Search
USPC ............... 370/254–258, 400–403, 407–410; 709/238–240
See application file for complete search history.

(56) References Cited

U.S. PATENT DOCUMENTS

| | | | | |
|---|---|---|---|---|
| 2014/0019639 | A1* | 1/2014 | Ueno | H04L 67/1002 709/238 |
| 2014/0241367 | A1* | 8/2014 | Ichino | H04L 45/02 370/392 |
| 2015/0063361 | A1* | 3/2015 | Hamada | G06F 3/0605 370/400 |
| 2016/0301629 | A1* | 10/2016 | Suzuki | H04L 49/25 |
| 2020/0106839 | A1* | 4/2020 | Takemura | H04L 67/16 |

FOREIGN PATENT DOCUMENTS

| | | |
|---|---|---|
| JP | 2019-062407 | 4/2019 |
| WO | WO-2015/045275 A1 | 4/2015 |

\* cited by examiner

FIG. 6

COMMUNICATION PATH CONTROL TABLE 150

| SWITCH DISPOSED FOR CONFERENCE ROOM | | | SWITCH DISPOSED FOR INFORMATION PROCESSING APPARATUS | | |
|---|---|---|---|---|---|
| LABEL | DATA PATH ID | PORT NUMBER | LABEL | DATA PATH ID | PORT NUMBER |
| CONFERENCE ROOM A | 0000000000000001 | port(eth)0-A | PRINTER "X" GROUP | 0000000000000011 | port(eth)1-X |
| CONFERENCE ROOM B | 0000000000000002 | port(eth)0-B | PRINTER "Y" | 0000000000000012 | port(eth)1-Ya |
| CONFERENCE ROOM B | 0000000000000002 | port(eth)0-B | ELECTRONIC INFORMATION BOARD "Y" | 0000000000000013 | port(eth)1-Yb |
| CONFERENCE ROOM C | 0000000000000003 | port(eth)0-C | PRINTER "Z" | 0000000000000014 | port(eth)1-Z |
| CONFERENCE ROOM C | 0000000000000003 | port(eth)0-C | PROJECTOR "Z" | 0000000000000014 | port(eth)2-Z |
| ... | ... | ... | ... | ... | ... |

FIG. 13

COMMUNICATION PATH CONTROL TABLE 150a

| | SWITCH DISPOSED FOR CONFERENCE ROOM | | | | SWITCH DISPOSED FOR INFORMATION PROCESSING APPARATUS | | | |
|---|---|---|---|---|---|---|---|---|
| LABEL | DATA PATH ID | PORT NUMBER | TRANSMISSION SOURCE TERMINAL NAME | TRANSMISSION SOURCE MAC ADDRESS | LABEL | DATA PATH ID | PORT NUMBER |
| CONFERENCE ROOM A | 0000000000000001 | port(eth)0-A | COMMUNICATION TERMINAL 30Aa | RR:RR:RR:RR:RR:AA | PRINTER "X" GROUP | 0000000000000011 | port(eth)1-X |
| CONFERENCE ROOM A | 0000000000000001 | port(eth)0-A | COMMUNICATION TERMINAL 30Ab | RR:RR:RR:RR:RR:AB | PRINTER "Y" | 0000000000000012 | port(eth)1-Ya |
| CONFERENCE ROOM B | 0000000000000002 | port(eth)0-B | COMMUNICATION TERMINAL 30B | RR:RR:RR:RR:RR:BB | PRINTER "Y" | 0000000000000012 | port(eth)1-Ya |
| CONFERENCE ROOM B | 0000000000000002 | port(eth)0-B | COMMUNICATION TERMINAL 30B | RR:RR:RR:RR:RR:BB | ELECTRONIC INFORMATION BOARD "Y" | 0000000000000013 | port(eth)1-Yb |
| CONFERENCE ROOM C | 0000000000000003 | port(eth)0-C | COMMUNICATION TERMINAL 30C | RR:RR:RR:RR:RR:CC | PRINTER "Z" | 0000000000000014 | port(eth)1-Z |
| CONFERENCE ROOM C | 0000000000000003 | port(eth)0-C | COMMUNICATION TERMINAL 30C | RR:RR:RR:RR:RR:CC | PROJECTOR "Z" | 0000000000000014 | port(eth)2-Z |
| ... | ... | ... | ... | ... | ... | ... | ... |

NETWORK SYSTEM, COMMUNICATION CONTROL DEVICE, AND METHOD OF CONTROLLING COMMUNICATION

CROSS-REFERENCE TO RELATED APPLICATION

This application claims priority pursuant to 35 U.S.C. § 119(a) to Japanese Patent Application No. 2018-181653, filed on Sep. 27, 2018 in the Japan Patent Office, the disclosure of which is incorporated by reference herein in its entirety.

BACKGROUND

Technical Field

This disclosure relates to a network system, a communication control device, and a method of controlling communication.

Background Art

Organizations, such as companies, have built network systems such as communication networks using local area network (LAN) to connect communication terminals and information processing apparatuses (e.g., printers) used in the organizations with each other via the communication networks.

A method of automatically identifying information processing apparatuses connected to a communication network using a communication terminal is known as Neighbor Discovery Protocol. When one communication terminal broadcasts a discovery packet using Neighbor Discovery Protocol as a search request, and the one communication terminal receives a response from one or more information processing apparatuses compatible to the protocol, the one communication terminal can acquire information on the one or more information processing apparatuses connected to the communication network.

However, in conventional methods, since the discovery packet (e.g., response request to the information processing apparatus) is broadcasted from the communication terminal to all of information processing apparatuses connected to the same network (e.g., LAN), it is almost impossible to find a specific information processing apparatus alone.

SUMMARY

As one aspect of the present invention, a network system including one or more communication terminals and one or more information processing apparatuses connectable with the one or more communication terminals via a communication network is devised. The network system includes one or more first switches for connecting the one or more communication terminals that transmit a response request to the communication network, one or more second switches for connecting the one or more information processing apparatuses to the communication network, and a communication control device for controlling communication between the one or more communication terminals and the one or more information processing apparatuses via the one or more first switches and the one or more second switches. The communication control device is configured to receive, from a specific communication terminal via a specific first switch, a specific response request to be transmitted to a specific information processing apparatus, determine, based on communication path information associating transmission source information identifying the one or more first switches and forwarding destination information identifying the one or more second switches, a specific second switch identified by specific forwarding destination information associated with specific transmission source information identifying the specific first switch that has transmitted the specific response request to the communication control device, as a forwarding destination of the specific response request, and transfer the specific response request to the determined specific second switch connected to the specific information processing apparatus. The specific communication terminal, which has transmitted the specific response request to the communication network via the specific first switch, receives a return response with respect to the specific response request from the specific information processing apparatus via the specific second switch and the specific first switch.

As another aspect of the present invention, a communication control device for controlling communication between one or more communication terminals and one or more information processing apparatuses connectable with each other via a communication network including one or more first switches for connecting the one or more communication terminals to the communication network and one or more second switches for connecting the one or more information processing apparatuses to the communication network is devised. The communication control device includes circuitry configured to receive, from a specific communication terminal via a specific first switch, a specific response request to be transmitted to a specific information processing apparatus, determine, based on communication path information associating transmission source information identifying the one or more first switches and forwarding destination information identifying the one or more second switches, a specific second switch identified by specific forwarding destination information associated with specific transmission source information identifying the specific first switch that has transmitted the specific response request to the communication control device, as a forwarding destination of the specific response request, and transfer the specific response request to the determined specific second switch connected to the specific information processing apparatus.

As another aspect of the present invention, a method of controlling communication between one or more communication terminals and one or more information processing apparatuses connectable with each other via a communication network including one or more first switches for connecting the one or more communication terminals to the communication network and one or more second switches for connecting the one or more information processing apparatuses to the communication network is devised. The method includes receiving, from a specific communication terminal via a specific first switch, a specific response request to be transmitted to a specific information processing apparatus, determining, based on communication path information associating transmission source information identifying the one or more first switches and forwarding destination information identifying the one or more second switches, a specific second switch identified by specific forwarding destination information associated with specific transmission source information identifying the specific first switch that has transmitted the specific response request to the communication control device, as a forwarding destination of the specific response request, and transferring the specific response request to the determined specific second switch connected to the specific information processing apparatus.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 6 is an example of a communication path control table according to the embodiment;

FIG. 13 is a variant example of a communication path control table according to the embodiment.

Figure 1:
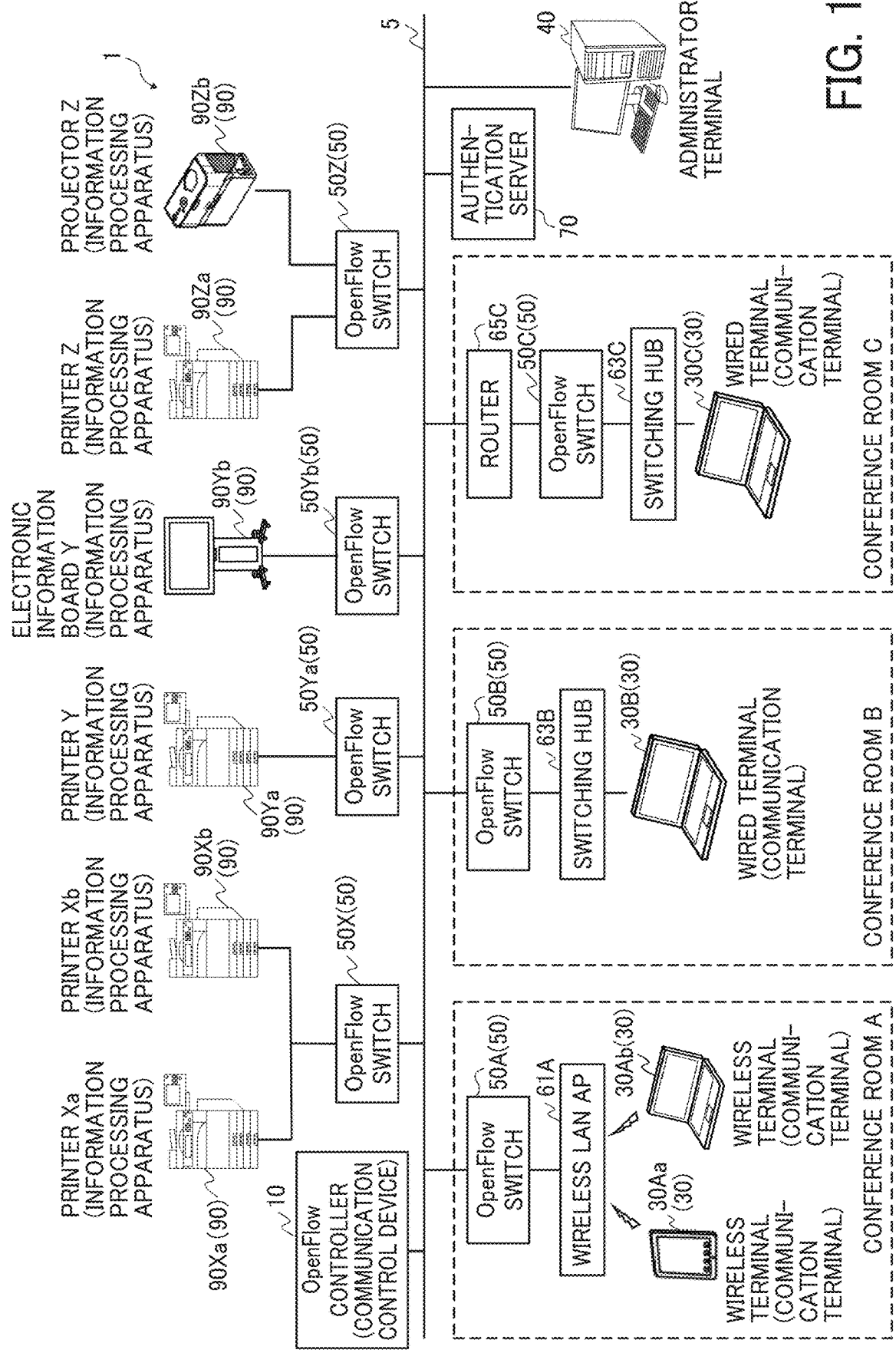
FIG. 1 is an example of a system configuration of a network system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments of the present invention with reference to the drawings. In the description of the drawings, the same elements are denoted by the same reference numerals, and duplicate explanations are omitted.

System Configuration:

FIG. 1 illustrates an example system configuration of a network system 1 according to an embodiment. As illustrated in FIG. 1, the network system 1 includes, for example, one or more communication terminals 30 and one or more information processing apparatuses 90 connectable with each other via a network. As disclosed in this specification, when one communication terminal 30 transmits a response request to a communication network for searching a specific information processing apparatus 90 via the communication network, the one communication terminal 30 can find or detect the specific information processing apparatus 90 alone among the information processing apparatuses 90 connected to the same communication network.

As illustrated in FIG. 1, the network system 1 can be configured using a communication network 5 constructed within an entity or organization, such as company, in which each device and apparatus is connected to the communication network 5 to communicate with each other. As illustrated in FIG. 1, the network system 1 includes, for example, a plurality of communication terminals 30, a plurality of information processing apparatuses 90, a plurality of OpenFlow switches 50, a communication control device 10, an authentication server 70, and an administrator terminal 40.

Hereinafter, the plurality of communication terminals 30 provided in each conference room, such as terminals 30Aa, 30Ab, 30B, and 30C, are referred to as the communication terminal 30 when distinguishing of the communication terminals 30 is not required.

Hereinafter, the plurality of information processing apparatuses 90, such as information processing apparatuses 90Xa, 90Xb, 90Ya, 90Yb, 90Za, and 90Zb are referred to as the information processing apparatus 90 when distinguishing of the information processing apparatuses 90 is not required.

Hereinafter, the plurality of OpenFlow switches 50, such as OpenFlow switches 50A, 50B, 50C, 50X, 50Ya, 50Yb, and 50Z are referred to as the OpenFlow switch 50 when distinguishing of the OpenFlow switches 50 is not required. The OpenFlow switch 50 is used to connect each communication terminal 30 or each information processing apparatus 90 to the communication network 5.

The communication control device 10 controls communication between the communication terminal 30 and the information processing apparatus 90. The number of the terminals and apparatuses can be changed to any number in view of the entity or organization, such as company.

In the network system 1, the communication control device 10 uses the OpenFlow switching technology to control a forwarding destination of packet transmitted and received between the OpenFlow switch 50 (50A, 50B, 50C) connected to the communication terminals 30 and the Open- Flow switch 50 (50X, 50Ya, 50Yb, 50Z) connected to the information processing apparatuses 90. The OpenFlow switching technology regards the communication as an end-to-end flow, and separates a control-plane and data-plane, in which the control-plane performs data analysis, forwarding destination determination, and determination control while the data-plane performs physical transmission of packets. In the OpenFlow switching technology, an OpenFlow controller (communication control device 10), which performs processing of the control-plane, instructs the forwarding destination rule, and the OpenFlow switch 50, which performs processing of data-plane, transfers packets in accordance with the instruction from the OpenFlow controller (communication control device 10). Specifically, the OpenFlow controller (communication control device 10) adds and writes to a flow table included in the OpenFlow switch 50, and the OpenFlow switch 50 transfers the packets based on the flow table.

In the network system 1, a space-based network node is set for each of conference rooms, which means the space-based network nodes set in the conference rooms are mutually different network nodes. In this description, the conference room is used as an example of locations, such as booth, compartment, office, factory, or other places. For example, in conference room A, the communication terminals 30Aa and 30Ab, serving as wireless terminals, are connected to the OpenFlow switch 50A via a wireless local area network (LAN) access point (AP) 61A. Therefore, the communication terminals 30Aa and 30Ab can be connected to the communication network 5 via the OpenFlow switch 50A.

Further, in conference room B, the communication terminal 30B, serving as a wired terminal, is connected to the OpenFlow switch 50B via a switching hub 63B. Therefore, the communication terminal 30B can be connected to the communication network 5 via the OpenFlow switch 50B.

Further, in conference room C, the communication terminal 30C, serving as a wired terminal, is connected to the OpenFlow switch 50C via the switching hub 63C and is connected to a router 65C via the OpenFlow switch 50C, in which the router 65C is set at a higher level of the OpenFlow switch 50C. Therefore, the communication terminal 30C can be connected to the communication network 5 via the router 65C. In a case of conference room C, a network segment in the conference room C and a network segment of the information processing apparatus 90 become different.

The communication terminal 30 is, for example, a terminal portable and operable by a user, such as a notebook personal computer (PC) or a tablet terminal, and can be connected to the communication network 5 wirelessly or via wire. The communication terminal 30 can be a cellular phone, a smartphone, a game machine, a personal digital assistance (PDA), a digital camera, a wearable PC, a desktop PC, or the like.

The information processing apparatus 90 is, for example, a shared facility resource allocated for each conference room such as a printer, an electronic information board such as interactive white board (IWB) that can communicate with another apparatus, and a projector. For example, the information processing apparatus 90 allocated to conference room A is a printer Xa and a printer Xb, the information processing apparatus 90 allocated to conference room B is a printer Y and an electronic information board Y, and the information processing apparatus 90 allocated to conference room C is a printer Z and a projector Z. The information processing apparatus 90 is not limited thereto. For example, the information processing apparatus 90 can be any output apparatus, such as digital signage, head-up display (HUD) device, industrial machine, imaging device, sound collection device, medical device, network appliance, personal computer (PC), mobile phone, smart phone, tablet terminal, game machine, personal digital assistant (PDA), digital camera, wearable PC, and desktop PC.

Further, two or more information processing apparatuses 90 such as the printer Xa and the printer Xb can be connected to one OpenFlow switch 50X. Further, the printer Y and the electronic information board Y can be connected to the OpenFlow switch 50Ya and the OpenFlow switch 50Yb, respectively. Further, the printer Z and the projector Z can be connected to different communication ports of the OpenFlow switch 50Z as indicated in FIG. 1.

The authentication server 70 is a server that performs a network authentication processing for the communication terminal 30 or a user who uses the communication terminal 30.

The administrator terminal 40 is a terminal used by an administrator of the network system 1. The administrator terminal 40 performs, for example, setting and changing of various information controlled or managed by the communication control device 10 based on an input operation of the administrator. The administrator terminal 40 is, for example, a communication device such as desktop PC. The administrator terminal 40 can be a notebook PC, a cellular phone, a smartphone, a tablet device, a wearable PC, or the like.

The OpenFlow switch 50, comprising the network system 1, can be installed inside a network device, such as the wireless LAN AP 61A, the switching hub 63B, the switching hub 63C, and the router 65C provided within the conference room, or each of the information processing apparatuses 90.

Figure 2:
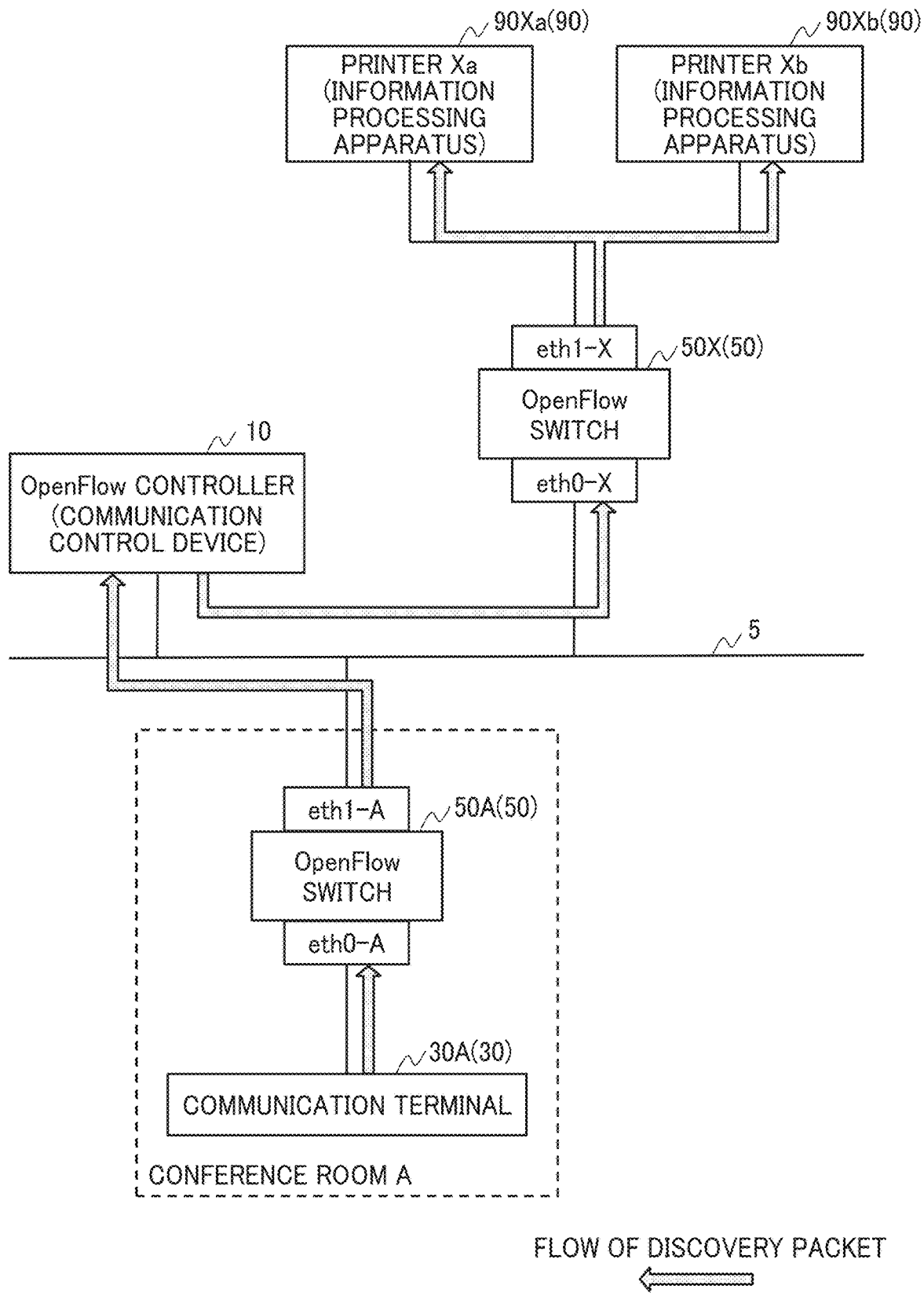
FIG. 2 is an example schematic diagram of a search processing of an information processing apparatus in the network system according to the embodiment.

Scheme of Search Processing:

FIG. 2 is an example schematic diagram of a search processing of the information processing apparatus 90 in the network system 1 according to the embodiment. FIG. 2 illustrates a scheme of a flow of discovery packet that is transmitted from the communication terminal 30A belonging to conference room A illustrated in FIG. 1. The discovery packet is a packet, which can be broadcasted by the communication terminal 30A in accordance with Neighbor Discovery Protocol, for searching the information processing apparatus 90 connected to the communication network 5. The discovery packet is an example of a response request to be transmitted to the information processing apparatus 90 from the communication terminal 30A. FIG. 2 illustrates a simplified description of the network system 1 according to the embodiment, and details of the functions implemented by the network system 1 will be described later with reference to drawings.

First, when the communication terminal 30A receives a search request of the information processing apparatus 90 from a user of the communication terminal 30A, the communication terminal 30A broadcasts the discovery packet (i.e., a response request to be transmitted to the information processing apparatus 90). Then, the discovery packet transmitted from the communication terminal 30A is received (packet-in) by a port(eth)0-A of the OpenFlow switch 50A. Then, the discovery packet is transferred to the OpenFlow controller (communication control device 10) via the communication network 5 from a port(eth)1-A of the OpenFlow switch 50A. The OpenFlow switch 50 (e.g., OpenFlow switch 50A located in conference room A) connected to the communication network 5 is disposed in a given space such as the conference room, and used for connecting the communication terminal 30 to the communication network 5. In this description, the OpenFlow switch 50 in conference room A (e.g., OpenFlow switch 50A located in conference room A) is described as an example of a first switch.

Then, the OpenFlow controller (communication control device 10) transfers (packet-out) the discovery packet to an appropriate OpenFlow switch based on information included in the received (packet-in) discovery packet and a communication path control table 150 to be described later. In this description, the control table may be also referred to as management table. In this example case, the OpenFlow controller (communication control device 10) transfers the discovery packet to the OpenFlow switch 50X.

The discovery packet transferred from the communication control device 10 is received (packet-in) by a port(eth)0-X of the OpenFlow switch 50X. Then, the discovery packet is transferred from a port(eth)1-X of the OpenFlow switch 50X to the printer Xa (information processing apparatus 90Xa) and the printer Xb (information processing apparatus 90Xb). In this configuration, the OpenFlow switch 50 (e.g., OpenFlow switch 50X) connects the information processing apparatus 90 to the communication network 5 In this description, the OpenFlow switch 50 (e.g., OpenFlow switch 50X) that connects the information processing apparatus 90 to the communication network 5 is described as an example of a second switch.

As a result, the discovery packet transmitted from the communication terminal 30A reaches the printer Xa (information processing apparatus 90Xa) and the printer Xb (information processing apparatus 90Xb). With this configuration, in the network system 1, the communication control device 10 controls the packet-in and packet-out from one OpenFlow switch 50 to another OpenFlow switch 50, with which the discovery packet can be transmitted from a specific communication terminal 30 to a specific information processing apparatus 90.

Further, in response to receiving the discovery packet at the specific information processing apparatus 90, the specific information processing apparatus 90 transmits a response (or return response) with respect to the received discovery packet, to the communication terminal 30A, which is a transmission source of the discovery packet that is received by the specific information processing apparatus 90. Then, by receiving the response (or return response) from the specific information processing apparatus 90, the communication terminal 30A can find or detect only the specific information processing apparatus 90 that has received the discovery packet, among the information processing apparatuses 90 connected to the communication network 5.

Hardware Configuration:

Hereinafter, a description is given of a hardware configuration of each device, terminal and apparatus with reference to FIGS. 3 and 4. The hardware configuration of each device, terminal and apparatus according to the embodiment employs a general computer configuration. At first, an example hardware configuration of the general computer will be described with reference to FIG. 3.

Figure 3:
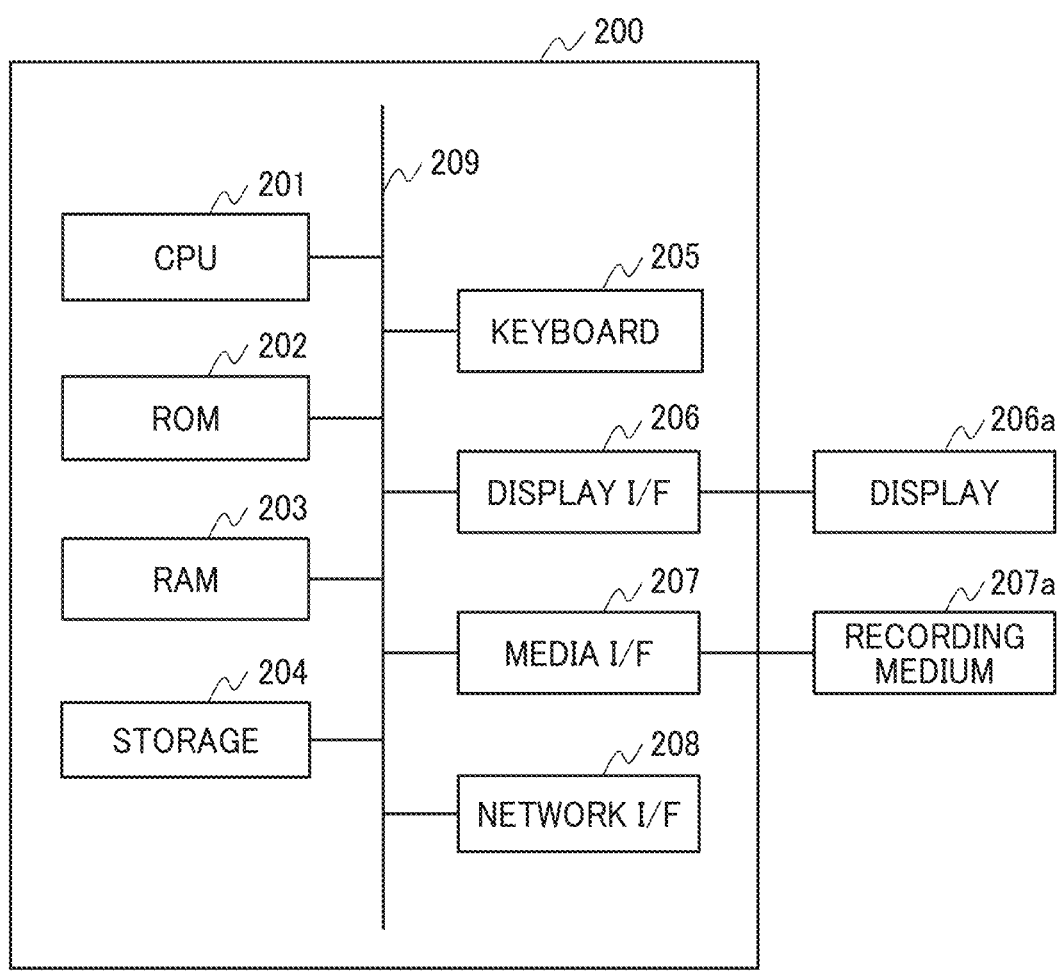
FIG. 3 is an example block diagram of a hardware configuration of a computer according to the embodiment.
Figure 4:
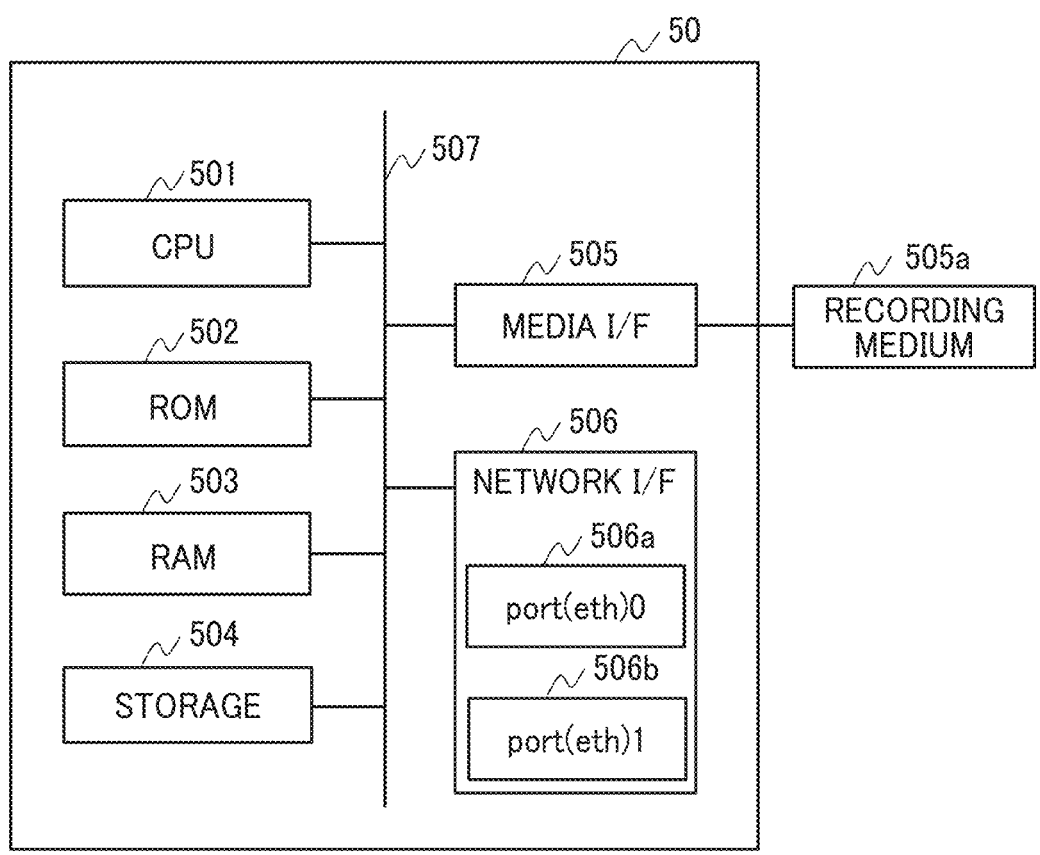
FIG. 4 is an example block diagram of a hardware configuration of an OpenFlow switch according to the embodiment.

Hardware Configuration of Computer:

FIG. 3 is an example block diagram of a hardware configuration of a computer 200 according to the embodiment. The computer 200 includes, for example, a central processing unit (CPU) 201, a read only memory (ROM) 202, a random access memory (RAM) 203, a storage 204, a keyboard 205, a display interface (I/F) 206, a media interface (I/F) 207, a network interface (I/F) 208, and a bus line 209.

The CPU 201 is a computing device that reads program and data stored in the ROM 202 and the storage 204, loads the program and data on the RAM 203 and executes the program to implement each of functions or processing of the computer 200. For example, the communication control device 10 executes one or more programs according to the embodiment to implement a communication control method according to the embodiment. Hereinafter, the one or more programs may be simply referred to as the program.

The ROM 202 is a nonvolatile memory capable of retaining the program and data even when the power supply is turned off. The ROM 202 employs, for example, a flash ROM or the like. The ROM 202 can be installed with one or more applications, such as software development kit (SDK) and application programming interface (API), and the functions of the computer 200 and the network connection can be implemented using the installed applications.

The RAM 203 is a volatile memory used as a working area of the CPU 201. The storage 204 is, for example, a storage device such as a hard disk drive (HDD), a solid-state drive (SSD). The storage 204 stores, for example, an operating system (OS), one or more application programs, and various data.

The keyboard 205 is a type of input unit equipped with a plurality of keys for inputting characters, numerals, various instructions, and the like. The input unit can be, for example, a mouse, a touch panel, a voice input device, or the like, as well as the keyboard 205.

The display I/F 20 controls display of various information such as cursor, menus, windows, characters, or the like on a display 206a, such as liquid crystal display (LCD). The display 206a can be a touch panel display having an input unit.

The media I/F 207 controls reading and writing (storing) of data to a recording medium 207a, such as a universal serial bus (USB) memory, a memory card, an optical disk, or a flash memory.

The network I/F 208 is an interface for connecting the computer 200 to the network and transmitting and receiving data to and from another computer, electronic device, or the like. The network I/F 208 is a communication interface, such as a wired or a wireless local area network (LAN). The network I/F 208 can employ any communication interface, such as interfaces of 3G (3rd Generation), LTE (Long Term Evolution), 4G (4th Generation), 5G (5th Generation), Zigbee (registered trademark), Bluetooth (registered trademark) Low Energy (BLE), and millimeter wave radio communication.

The bus line 209 is connected to each of the above described components, and transmits address signals, data signals, and various control signals. The CPU 201, ROM 202, RAM 203, storage 204, keyboard 205, display I/F 206, media I/F 207 and network I/F 208 are connected to each other via the bus line 209.

The hardware configuration of each device, terminal and apparatus according to the embodiment can be added or deleted as needed. For example, the communication control device 10 and the authentication server 70 can be configured without the input unit, such as the keyboard 205, and the display 206a. Further, the information processing apparatus 90 can include one or more modules for providing functions and services according to the type of each device, terminal and apparatus.

Hardware Configuration of OpenFlow Switch:

Hereinafter, a description is given of a hardware configuration of the OpenFlow switch 50 with reference to FIG. 4. FIG. 4 is an example block diagram of a hardware configuration of the OpenFlow switch 50 according to the embodiment. The OpenFlow switch 50 includes, for example, a CPU 501, a ROM 502, a RAM 503, a storage 504, a media interface (I/F) 505, a network interface (I/F) 506, and a bus line 507.

The CPU 501 is a computing device that reads program and data stored in the ROM 502 and the storage 504, loads the program and data on the RAM 503 and executes the program to implement each of functions or processing of the OpenFlow switch 50.

The ROM 502 is a non-volatile memory capable of retaining the program and data even when the power supply is turned off. The ROM 502 employs, for example, a flash ROM or the like. The ROM 502 can be installed with one or more applications, such as an SDK (Software Development Kit) and an Application Programming Interface (API), and the functions of the OpenFlow switch 50 and the network connection can be implemented using the installed applications.

The RAM 503 is a volatile memory used as a working area of the CPU 501. The storage 504 is, for example, a storage device such as a hard disk drive (HDD), a solid-state drive (SSD). The storage 504 stores, for example, an operating system (OS), one or more application programs, and various data.

The media I/F 505 controls reading and writing (storing) of data to a recording medium 505*a*, such as a universal serial bus (USB) memory, a memory card, an optical disk, or a flash memory. The media I/F 505 can be used as an input/output interface (IF).

The network I/F 506 is an interface for connecting the OpenFlow switch 50 to the network and transmitting and receiving data to and from another computer, electronic device, or the like. The network I/F 506 includes a plurality of communication interfaces, such as a port 506*a* of "port (eth)0" and a port 506*b* of "port(eth)1," connectable to different connection destinations. The communication interface uses the communication port compatible to, for example, the transmission control protocol (TCP). The number of communication ports is not limited to two ports. For example, the OpenFlow switch 50Z illustrated in FIG. 1 includes three communication ports.

The bus line 507 is connected to each of the above components, and transmits address signals, data signals, and a variety of control signals. The CPU 501, ROM 502, RAM 503, storage 504, media I/F 505 and network I/F 506 are connected to each other via the bus line 507.

Figure 5:
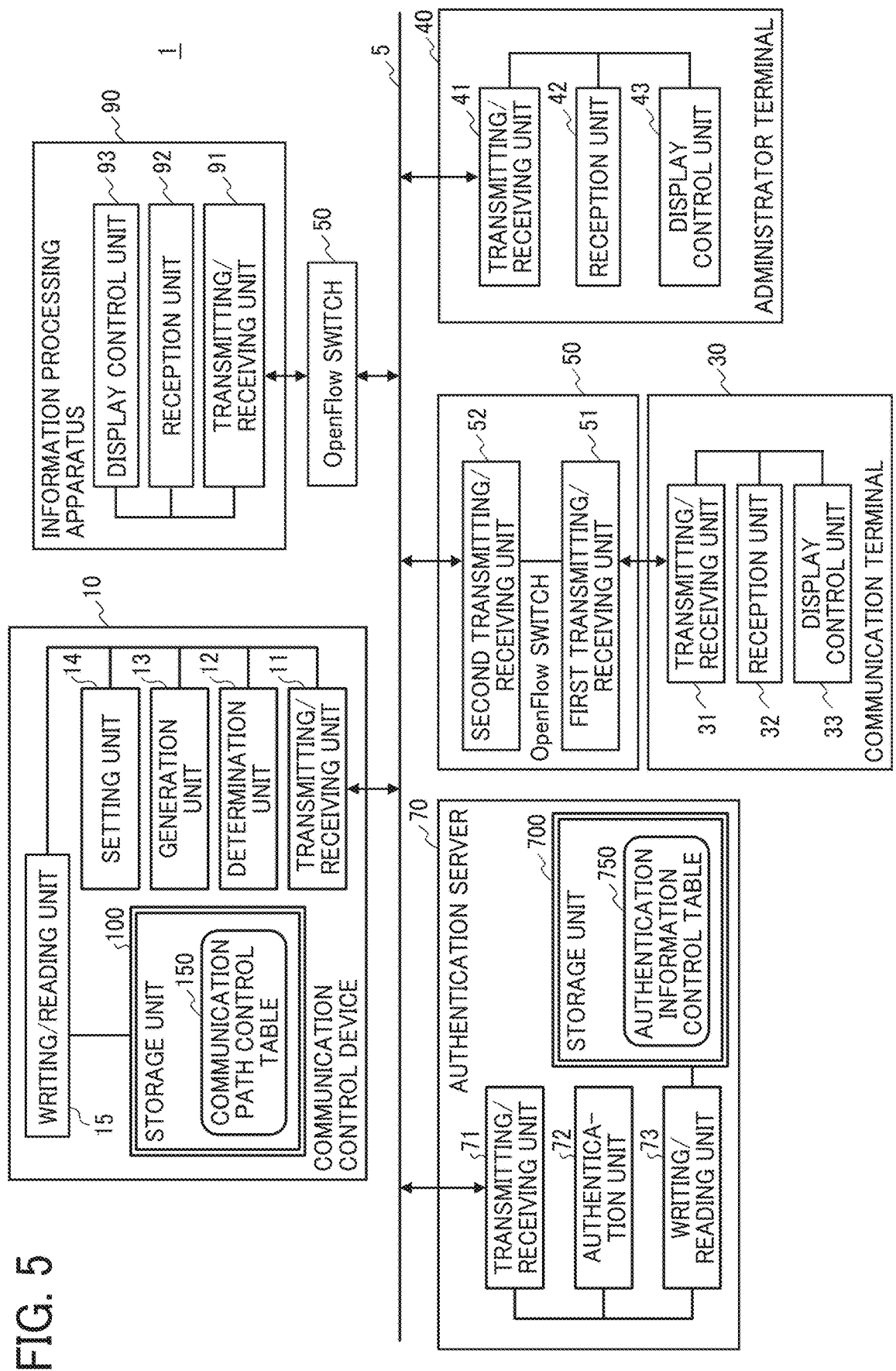
FIG. 5 is an example block diagram of a functional configuration of the network system according to the embodiment.

Functional Configuration:

Hereinafter, a description is given of a functional configuration of the network system 1 with reference to FIG. 5. FIG. 5 is an example block diagram of a functional configuration of the network system 1 according to the embodiment.

Functional Configuration of Communication Control Device:

Hereinafter, a description is given of a functional configuration of the communication control device 10. As illustrated in FIG. 5, the function implemented by the communication control device 10 includes, for example, a transmitting/receiving unit 11, a determination unit 12, a generation unit 13, a setting unit 14, a writing/reading unit 15, and a storage unit 100.

The transmitting/receiving unit 11 transmits and receives various data to and from an external device via the communication network 5. For example, the transmitting/receiving unit 11 receives a discovery packet transmitted from the communication terminal 30 via the OpenFlow switch 50. Further, the transmitting/receiving unit 11 transmits the discovery packet to the OpenFlow switch 50, which is a forwarding destination determined by the determination unit 12 to be described later. The transmitting/receiving unit 11 is implemented by, for example, the network I/F 208 and a program executed by the CPU 201 illustrated in FIG. 3. The transmitting/receiving unit 11 is an example of a receiving unit. The transmitting/receiving unit 11 is also an example of a transfer unit.

The determination unit 12 determines the forwarding destination of the discovery packet based on the discovery packet received by the transmitting/receiving unit 11 and a communication path control table 150 to be described later in FIG. 6. The communication path control table 150 includes transmission source information identifying one or more OpenFlow switches 50 that transfer the discovery packet, and forwarding destination information identifying one or more OpenFlow switches 50, in which the forwarding destination information is associated with the transmission source information. Therefore, the determination unit 12 can determine the one or more OpenFlow switches 50 indicated by the forwarding destination information as the forwarding destination of the discovery packet using the communication path control table 150. The determination unit 12 is implemented, for example, by executing a program using the CPU 201 illustrated in FIG. 3. The determination unit 12 is an example of a determination unit in this description.

The generation unit 13 generates a flow table indicating a communication transmission path of the discovery packet based on the forwarding destination of the discovery packet determined by the determination unit 12. For example, the generation unit 13 generates the flow table storing information indicating the OpenFlow switches 50 used as the transmission source and information indicating the OpenFlow switches 50 used as the forwarding destination of the discovery packet used in the OpenFlow switching technology. The generation unit 13 is implemented by, for example, a program executed by the CPU 201 illustrated in FIG. 3. The generation unit 13 is an example of a generation unit.

The setting unit 14 sets communication path information such as the communication path control table 150 (FIG. 6) to be described later, by executing one or more applications. The setting unit 14 is implemented by, for example, one or more programs executed by the CPU 201 illustrated in FIG. 3.

The writing/reading unit 15 stores various data in the storage unit 100 and reads various data from the storage unit 100. The writing/reading unit 15 is implemented by, for example, one or more programs executed by the CPU 201 illustrated in FIG. 3. The writing/reading unit 15 is an example of a storage control unit.

The storage unit 100 is implemented by, for example, the ROM 202, the storage 204, or the recording medium 207*a* illustrated in FIG. 3. Further, the storage unit 100 stores the communication path control table 150.

Communication Path Control Table:

Hereinafter, a description is given of the communication path control table 150 stored in the storage unit 100 with reference to FIG. 6. FIG. 6 is an example of the communication path control table 150 according to the embodiment. As illustrated in FIG. 6, the communication path control table 150 sets or defines a transmission rule for packets to be transmitted and received between the communication terminal 30 and the information processing apparatus 90. The communication path control table 150 controls or manages combinations of the OpenFlow switch 50 disposed for the conference room (i.e., communication terminal 30) and the OpenFlow switch 50 disposed for the information processing apparatus 90 illustrated in FIG. 1. Specifically, the communication path control table 150 controls or manages the communication path information by associating the transmission source information identifying the OpenFlow switch 50 disposed for the conference room (i.e., communication terminal 30) and the forwarding destination information identifying the OpenFlow switch 50 disposed for the information processing apparatus 90 for each combination of the transmission source information and forwarding destination information. The OpenFlow switch 50 disposed for the conference room (i.e., communication terminal 30) is an example of the first switch while the OpenFlow switch 50 disposed for the information processing apparatus 90 is an example of the second switch in this description.

As indicated in FIG. 6, the transmission source information includes, for example, label name, data path ID, and port number. The label name identifies an entity or location, such as a conference room to which the communication terminal 30 belongs. The data path ID indicates a communication path (data path) of the OpenFlow switch 50 that transfers the discovery packet transmitted from the communication terminal 30. The port number identifies a communication interface (communication port) of the OpenFlow switch 50 that transfers the discovery packet transmitted from the communication terminal 30. The port number is, for example, a TCP port number compatible to the TCP protocol of the OpenFlow switch 50. The data path ID included in the transmission source information is an example of transmission source path identification information, and the port number included in the transmission source information is an example of transmission source path information.

The forwarding destination information includes, for example, label name, data path ID, and port number. The label name identifies the information processing apparatus 90, which becomes the forwarding destination (transmission destination) of the discovery packet transmitted from the communication terminal 30. The data path ID indicates a communication path (data path) of the OpenFlow switch 50 for forwarding or transferring the packet to the information processing apparatus 90. The port number identifies a communication interface (communication port) of the OpenFlow switch 50 that forwards or transfers the packet to the information processing apparatus 90. The data path ID included in the forwarding destination information is an example of transmission destination path identification information. The port number included in the forwarding destination information is an example of transmission destination path information.

Functional Configuration of Communication Terminal:

Hereinafter, a description is given of a functional configuration of the communication terminal 30 with reference to FIG. 5. As illustrated in FIG. 5, the function implemented by the communication terminal 30 includes, for example, a transmitting/receiving unit 31, a reception unit 32, and a display control unit 33.

The transmitting/receiving unit 31 transmits and receives various data to and from an external device via the communication network 5. The transmitting/receiving unit 31 broadcasts a discovery packet compatible to Neighbor Discovery Protocol via the communication network 5. The transmitting/receiving unit 31 is implemented by, for example, one or more programs executed by the CPU 201 illustrated in FIG. 3. The transmitting/receiving unit 31 is an example of a response request transmitting unit. The transmitting/receiving unit 31 is also an example of a response receiving unit.

The reception unit 32 receives an input by a user to the input unit, such as the keyboard 205 illustrated in FIG. 3. The display control unit 33 displays various screen information on the display 206*a* illustrated in FIG. 3. For example, the display control unit 33 displays, on the display 206*a*, an operation screen that receives an input operation by a user, using a web browser. For example, the display control unit 33 displays a web page, such as hypertext markup language (HTML) web page on the display 206*a*.

Functional Configuration of Administrator Terminal:

Hereinafter, a description is given of a functional configuration of the administrator terminal 40 with reference to FIG. 5. As illustrated in FIG. 5, the function implemented by the administrator terminal 40 includes, for example, a transmitting/receiving unit 41, a reception unit 42, and a display control unit 43.

The transmitting/receiving unit 41 transmits and receives various data to and from an external device via the communication network 5. For example, the transmitting/receiving unit 41 transmits a request for setting a communication path of the packet to the communication control device 10 via the communication network 5. Further, the transmitting/receiving unit 41 transmits communication path information set by using a communication path setting screen 400 (see FIG. 12), to be described later, to the communication control device 10 via the communication network 5. The transmitting/receiving unit 41 is implemented by, for example, the network I/F 208 and a program executed by the CPU 201 illustrated in FIG. 3.

The reception unit 42 receives an input by a user to the input unit, such as the keyboard 205 illustrated in FIG. 3. The display control unit 43 displays various screen information on the display 206*a* illustrated in FIG. 3. For example, the display control unit 43 displays, on the display 206*a*, an operation screen that receives an input operation by a user, using a web browser. For example, the display control unit 43 displays a web page, such as HTML web page, on the display 206*a*.

Functional Configuration of OpenFlow Switch:

Hereinafter, a description is given of a functional configuration of the OpenFlow switch 50 with reference to FIG. 5. As illustrated in FIG. 5, the function implemented by the OpenFlow switch 50 includes, for example, a first transmitting/receiving unit 51, and a second transmitting/receiving unit 52. FIG. 5 illustrates one example case that the OpenFlow switch 50 has different two communication ports, such as the port 506*a* of "port(eth)0" and the port 506*b* of "port(eth)1" indicated in FIG. 4. If the OpenFlow switch 50 has different three communication ports, the function implemented by the OpenFlow switch 50 includes three transmitting/receiving units corresponding to the number of the communication ports.

The first transmitting/receiving unit 51 and the second transmitting/receiving unit 52 transmit and receive various data between the communication terminal 30 connected to the OpenFlow switch 50 and the information processing apparatus 90 connected to the OpenFlow switch 50 using the communication ports provided by the OpenFlow switch 50.

The first transmitting/receiving unit 51 transmits and receives various data via the communication port (e.g., port(eth)0-A, port(eth)1-X in FIG. 2) connected to the communication terminal 30 or the information processing apparatus 90. The second transmitting/receiving unit 52 transmits and receives various data via the communication port (e.g., port(eth)1-A, port(eth)0-X in FIG. 2) connected to the communication network 5. The first transmitting/receiving unit 51 and the second transmitting/receiving unit 52 are implemented by, for example, the network I/F 506 and a program executed by the CPU 501 illustrated in FIG. 4.

Functional Configuration of Authentication Server:

Hereinafter, a description is given of a functional configuration of the authentication server 70 with reference to FIG. 5. As illustrated in FIG. 5, the function implemented by the authentication server 70 includes, for example, a transmitting/receiving unit 71, an authentication unit 72, a writing/reading unit 73, and a storage unit 700.

The transmitting/receiving unit 71 transmits and receives various data to and from the communication terminal 30 to perform the authentication processing on the communication network 5. For example, the transmitting/receiving unit 71 receives an authentication request for a user using the communication terminal 30 to the communication network 5 or an authentication request for the communication terminal 30 to the communication network 5, which is transmitted from the communication terminal 30. Further, for example, the transmitting/receiving unit 71 transmits information indicating an authentication result for the received authentication request to the communication terminal 30. The transmitting/receiving unit 71 is implemented by, for example, by the network I/F 208 and one or more programs executed and the CPU 201 illustrated in FIG. 3.

The authentication unit 72 performs the authentication processing for the user using the communication terminal 30 to determine whether the user has an authentication of using the communication network 5. For example, the authentication unit 72 performs the authentication processing for the user based on the authentication request received by the transmitting/receiving unit 71 and authentication information included in an authentication information control table 750 (see FIG. 7). The communication terminal 30 used by the user and successfully authenticated by the authentication unit 72 can be connected to the communication network 5. The authentication unit 72 is implemented by, for example, one or more programs executed by the CPU 201 illustrated in FIG. 3.

The writing/reading unit 73 stores various data in the storage unit 700 and reads various data from the storage unit 700. The writing/reading unit 73 is implemented by, for example, one or more programs executed by the CPU 201 illustrated in FIG. 3. The storage unit 700 is implemented by, for example, the ROM 202, the storage 204, or the recording medium 207a illustrated in FIG. 3. Further, the storage unit 700 stores an authentication information control table 750 (FIG. 7) used for the user authentication processing by the authentication unit 72.

Figures 7, 8:
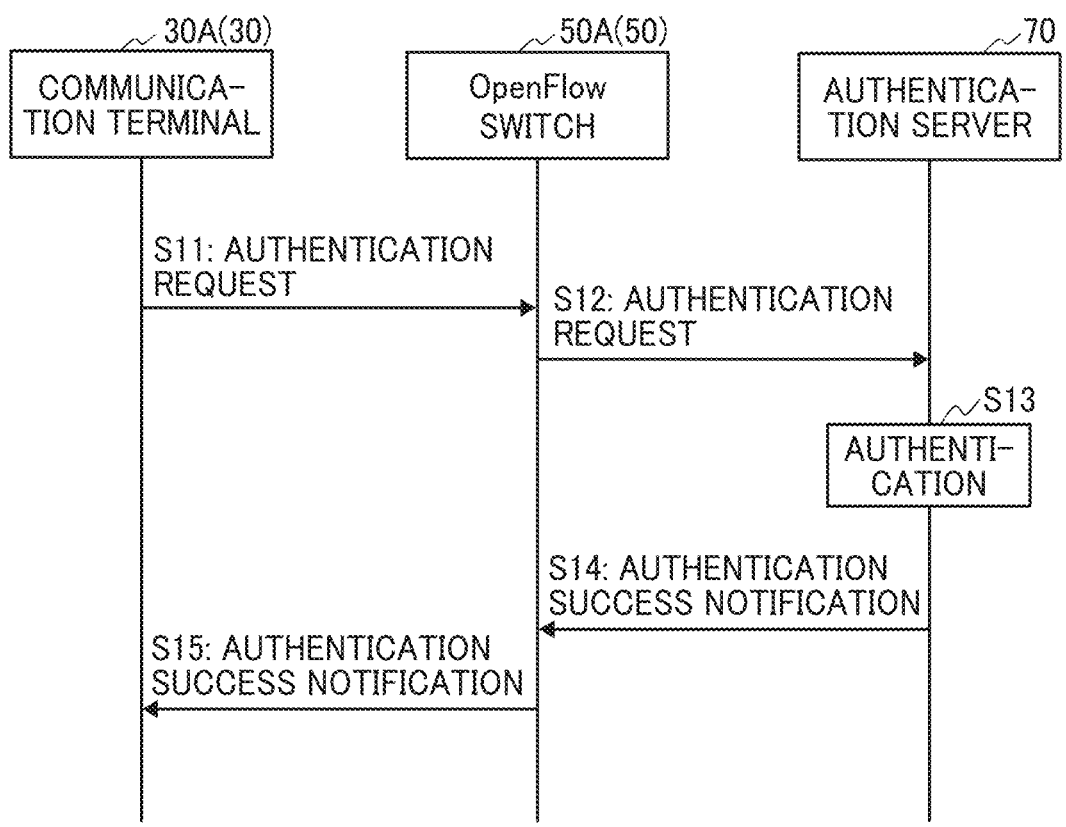
FIG. 7 is an example of an authentication information control table according to the embodiment.
FIG. 8 is an example sequence diagram illustrating a network authentication processing for a communication terminal according to the embodiment.

Authentication Information Control Table:

FIG. 7 is an example of the authentication information control table 750 according to the embodiment. As illustrated in FIG. 7, the authentication information control table 750 controls or manages authentication information used for the user authentication processing by the authentication server 70.

The authentication information control table 750 stores user names and passwords in association with each other as illustrated in FIG. 7. Hereinafter, the user name and password may mean one or more user names and passwords in this description. The user name is user identification information identifying a specific user using the communication terminal 30. Further, the user identification information can be terminal identification information, such as a terminal ID or a terminal name, identifying a specific communication terminal 30.

Functional Configuration of Information Processing Apparatus:

Hereinafter, a description is given of a functional configuration of the information processing apparatus 90 with reference to FIG. 5. As illustrated in FIG. 5, the function implemented by the information processing apparatus 90 includes, for example, a transmitting/receiving unit 91, a reception unit 92, and a display control unit 93. Further, the function implemented by the information processing apparatus 90 can include a function for implementing a configuration or service specific to the information processing apparatus (e.g., print control unit of printer).

The transmitting/receiving unit 91 transmits and receives various data to and from an external device via the communication network 5. For example, the transmitting/receiving unit 91 receives the discovery packet transmitted from the communication terminal 30 via the communication network 5. Further, for example, the transmitting/receiving unit 91 transmits a response (return response) to the received discovery packet to the communication terminal 30 that has transmitted the discovery packet via the communication network 5. The transmitting/receiving unit 91 is implemented by, for example, one or more programs executed by the CPU 201 illustrated in FIG. 3.

The reception unit 92 mainly receives an input by a user to the input unit, such as the keyboard 205 illustrated in FIG. 3, under the instruction from the CPU 201 illustrated in FIG. 3. The display control unit 93 mainly displays various screen information on the display 206a illustrated in FIG. 3 under the instruction from the CPU 201 illustrated in FIG. 3.

Processing and Operation:

Network Authentication Processing:

Hereinafter, a description is given of processing or operation of the network system 1 with reference to FIG. 8. At first, the network authentication processing of a user using the communication terminal 30 is described with reference to FIG. 8. FIG. 8 is an example sequence diagram illustrating a network authentication processing for the communication terminal 30 according to the embodiment. FIG. 8 illustrates an example of the authentication processing of a user using the communication terminal 30A installed in conference room A (FIG. 1) in the network system 1. Further, the user authentication processing can be performed by any communication terminal 30, which is set in any location other than conference room A.

In step S11, the transmitting/receiving unit 31 of the communication terminal 30A transmits an authentication request of the user using the communication terminal 30A to the OpenFlow switch 50A. The authentication request includes, for example, information on user name and password of the user using the communication terminal 30A. Then, the first transmitting/receiving unit 51 of the OpenFlow switch 50A receives the authentication request transmitted from the communication terminal 30A.

In step S12, the second transmitting/receiving unit 52 of the OpenFlow switch 50A transmits the authentication request, received by the first transmitting/receiving unit 51, to the authentication server 70. Then, the transmitting/receiving unit 71 of the authentication server 70 receives the authentication request transmitted from the communication terminal 30A.

In step S13, authentication unit 72 of the authentication server 70 authenticates the user using the communication terminal 30A based on the received user name and password. Specifically, the writing/reading unit 73 searches, in the authentication information control table 750 stored in the storage unit 700, for a combination of user name and password corresponding to the combination of user name and password received by the transmitting/receiving unit 71.

If the corresponding combination of user name and password exists in the authentication information control table 750, the authentication unit 72 determines that the requesting user is an authenticated or legitimate user. By contrast, if the corresponding combination of user name and password does not exist in the authentication information control table 750, the authentication unit 72 determines that the requesting user is not the authenticated user, which means an illegitimate (invalid) user. Hereinafter, it is assumed that the user is authenticated as the legitimate user.

In step S14, the transmitting/receiving unit 71 of the authentication server 70 transmits an authentication success notification to the OpenFlow switch 50A. Then, the second transmitting/receiving unit 52 of the OpenFlow switch 50A receives the authentication success notification.

In step S15, the first transmitting/receiving unit 51 of the OpenFlow switch 50A transmits the authentication success notification, received by the second transmitting/receiving unit 52, to the communication terminal 30A. Then, the transmitting/receiving unit 31 of the communication terminal 30A receives the authentication success notification.

With this configuration, in the network system 1, if the user using the communication terminal 30A located in conference room A is authenticated by the authentication server 70, the communication terminal 30A can be connected to the communication network 5. As to the network system 1, the authentication server 70 can be configured to control or manage the authentication information of user at each conference room, and set different network connection authentication for each conference room. Further, the network system 1 can be configured to perform the network authentication processing of user in cooperation with an external server, such as a conference server.

Figure 9:
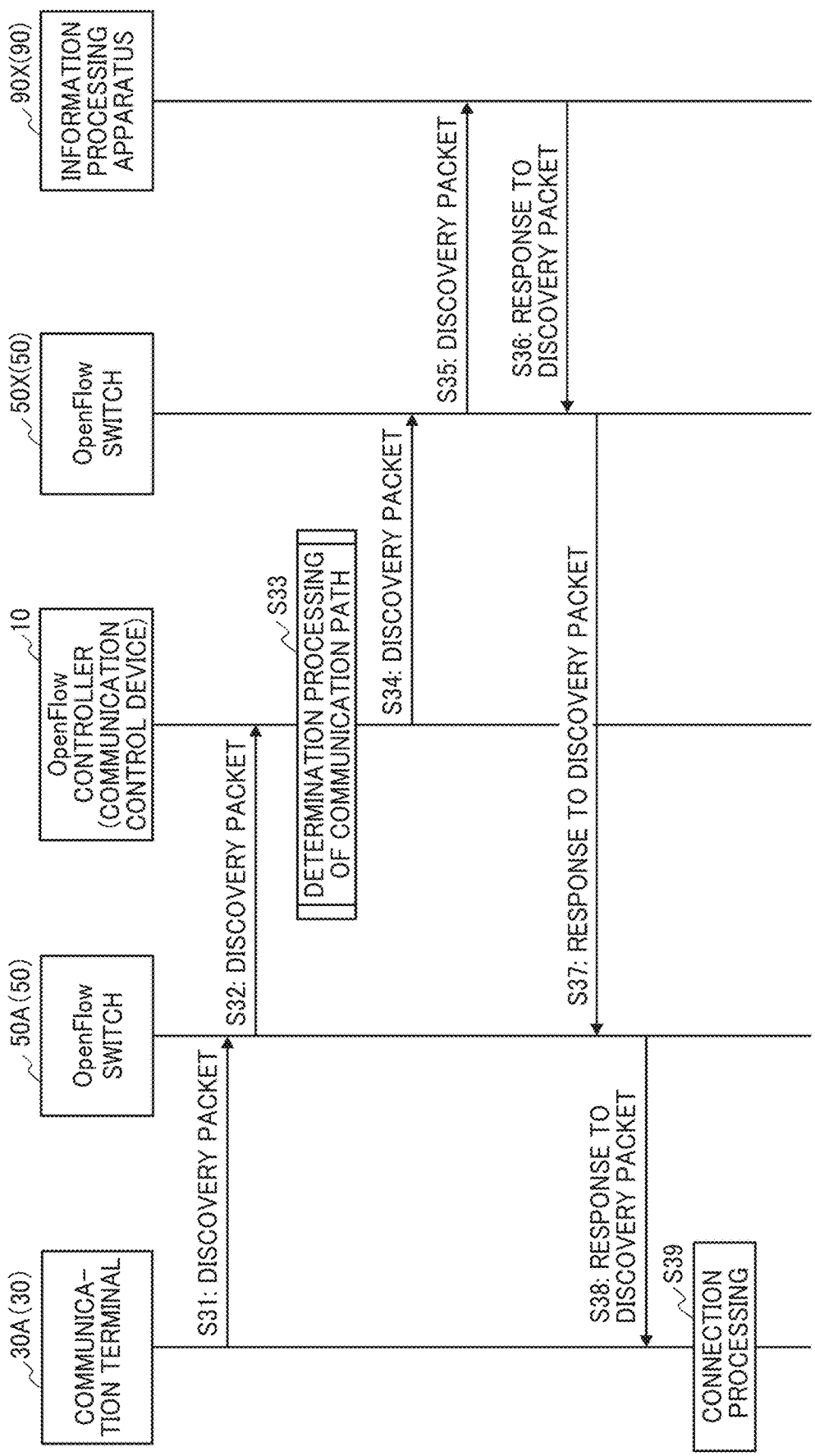
FIG. 9 is an example sequence diagram of search processing of an information processing apparatus for a communication terminal according to the embodiment.

Search Processing for Information Processing Apparatus:

Hereinafter, a description is given of the search processing of the information processing apparatus 90 on the communication network 5 for the communication terminal 30 with reference to FIGS. 9 and 10. FIG. 9 is an example sequence diagram of the search processing of the information processing apparatus 90 for the communication terminal 30 according to the embodiment. FIG. 9 illustrates an example case of the search processing for the communication terminal 30A located in conference room A, but the search processing can be also applied to any communication terminal 30, which is set in any location other than conference room A.

In step S31, the transmitting/receiving unit 31 of the communication terminal 30A transmits or broadcasts a discovery packet. Specifically, the transmitting/receiving unit 31 of the communication terminal 30A transmits the discovery packet compatible to Neighbor Discovery Protocol to the OpenFlow switch 50A. Then, the first transmitting/receiving unit 51 of the OpenFlow switch 50A receives the discovery packet via the port(eth)0-A (see FIG. 2).

In step S32, the second transmitting/receiving unit 52 of the OpenFlow switch 50A transfers the discovery packet, received by the first transmitting/receiving unit 51, from the port(eth)1-A of the OpenFlow switch 50A to the communication control device 10 via the communication network 5. Then, the transmitting/receiving unit 11 of the communication control device 10 receives the discovery packet transferred from the OpenFlow switch 50A (an example of reception step).

In step S33, when the communication control device 10 receives the discovery packet using the transmitting/receiving unit 11, the communication control device 10 performs the determination processing of communication path for the received discovery packet.

Hereinafter, a description is given of the determination processing of communication path performed by the communication control device 10 with reference to FIG. 10. FIG. 10 is an example flowchart illustrating the communication path determination processing at the communication control device 10 according to the embodiment. FIG. 10 illustrates an example case, in which a discovery packet is transmitted from the communication terminal 30A same as in FIG. 9.

In step S33-1, the transmitting/receiving unit 11 of the communication control device 10 receives the discovery packet transmitted from the communication terminal 30A. The discovery packet received by the transmitting/receiving unit 11 includes, for example, the transmission source path identification information indicating the communication path (data path) of the OpenFlow switch 50 that has transferred the discovery packet, and the transmission source path information specifying or identifying the communication interface of the OpenFlow switch 50A that has transferred the discovery packet. The transmission source path information is, for example, a TCP port number set for the communication port of the OpenFlow switch 50A.

Then, in step S33-2, the writing/reading unit 15 of the communication control device 10 reads out the communication path control table 150 stored in the storage unit 100.

In step S33-3, the determination unit 12 of the communication control device 10 uses the transmission source path identification information and the transmission source path information included in the discovery packet, received by the transmitting/receiving unit 11, as the search key to extract forwarding destination information associated with the corresponding transmission source path identification information and the corresponding transmission source path information included in the communication path control table 150. In this example case, since the discovery packet transmitted from the communication terminal 30 is transferred by the OpenFlow switch 50A, the transmission source path identification information (i.e., data path) is "0000000000000001" and the transmission source path information (i.e., port number) is "port(eth)0-A" (see FIG. 6). Therefore, the determination unit 12 determines the forwarding destination information including the label of "printer X group," the transmission destination path identification information (i.e., data path) of "0000000000000011" and the transmission destination path information (i.e., port number) of "port(eth)1-X" as the forwarding destination of the discovery packet.

In step S33-4, the generation unit 13 of the communication control device 10 generates a flow table defining the communication path of the discovery packet based on the forwarding destination information extracted by the determination unit 12 in step S33-3. Specifically, the generation unit 13 generates the flow table defining the OpenFlow switch 50 used as the transmission source and the OpenFlow switch 50 used as the forwarding destination of the discovery packet used in the OpenFlow switching technology. In this example case, the generation unit 13 generates the flow table, in which the OpenFlow switch 50A is disposed at the transmission source of the discovery packet and the OpenFlow switch 50X is disposed at the forwarding destination of the discovery packet.

With this configuration, the communication control device 10 can determine the OpenFlow switch 50X as the forwarding destination of the discovery packet transmitted from the communication terminal 30A located in conference room A so that the discovery packet transmitted from the communication terminal 30A can be transmitted to the information processing apparatus 90X alone connected to the OpenFlow switch 50X.

Referring back to FIG. 9, the description of the search processing of the information processing apparatus 90 in the network system 1 is further continued.

In step S34, the transmitting/receiving unit 11 of the communication control device 10 transmits the discovery packet transmitted from the communication terminal 30A to the OpenFlow switch 50X, which is the forwarding destination of the discovery packet determined by the communication path determination processing in step S33 (an example of transfer step). The second transmitting/receiving unit 52 of the OpenFlow switch 50X receives the discovery packet transferred from the communication control device 10 via the port(eth)0-X (see FIG. 2).

In step S35, the first transmitting/receiving unit 51 of the OpenFlow switch 50X transmits the discovery packet, received by the second transmitting/receiving unit 52, from the port(eth)1-X of the OpenFlow switch 50X to the information processing apparatus 90X (see FIG. 2). In this example case, the first transmitting/receiving unit 51 transmits the discovery packet to all of the information processing apparatuses 90X (e.g., printer Xa, printer Xb in FIGS. 1 and 2) connected to the OpenFlow switch 50X.

In step S36, if the transmitting/receiving unit 91 of the information processing apparatus 90X receives the discovery packet, which has been transmitted from the communication terminal 30, the transmitting/receiving unit 91 of the information processing apparatus 90X transmits a response (return response) to the received discovery packet to the communication terminal 30A.

In this configuration, the response (return response) to the discovery packet includes, for example, identification information identifying the information processing apparatus 90X and destination information indicating the destination of the communication terminal 30A. The destination information of the communication terminal 30A is, for example, media access control (MAC) address set for the communication terminal 30A. Specifically, the transmitting/receiving unit 91 transmits the response to the discovery packet to the OpenFlow switch 50X. Then, the first transmitting/receiving unit 51 of the OpenFlow switch 50X receives the response to the discovery packet via the port(eth)1-X.

In step S37, the second transmitting/receiving unit 52 of the OpenFlow switch 50X transmits the response to the discovery packet, received by the first transmitting/receiving unit 51, from the port(eth)0-X of the OpenFlow switch 50X to the OpenFlow switch 50A via the communication network 5. Then, the second transmitting/receiving unit 52 of the OpenFlow switch 50A receives the response to the discovery packet via the port(eth)1-A.

In step S38, the first transmitting/receiving unit 51 of the OpenFlow switch 50A transmits the response to the discovery packet, received by the second transmitting/receiving unit 52, from the port(eth)0-A of the OpenFlow switch 50A to the communication terminal 30A. Then, the transmitting/receiving unit 31 of the communication terminal 30A receives the response to the discovery packet.

In step S39, the communication terminal 30A performs the connection processing with the information processing apparatus 90 that has transmitted the response to the discovery packet. For example, the communication terminal 30A establishes a connection with the information processing apparatus 90X, specified or identified by the identification information included in the response received by the transmitting/receiving unit 31, and displays information indicating the specified or identified information processing apparatus 90X on the display 206a as the useable information processing apparatus 90.

As to the above described network system 1, the communication control device 10 determines the transmission destination of the discovery packet transmitted from the communication terminal 30 for each of the space-based network nodes, such as each conference room where the communication terminal 30 is located. Therefore, as to the network system 1, the discovery packet can be transmitted to a specific information processing apparatus 90 alone from the communication terminal 30. Then, the communication terminal 30 can find or detect the specific information processing apparatus 90 alone based on the response to the discovery packet transmitted from the communication terminal 30.

Figure 11:
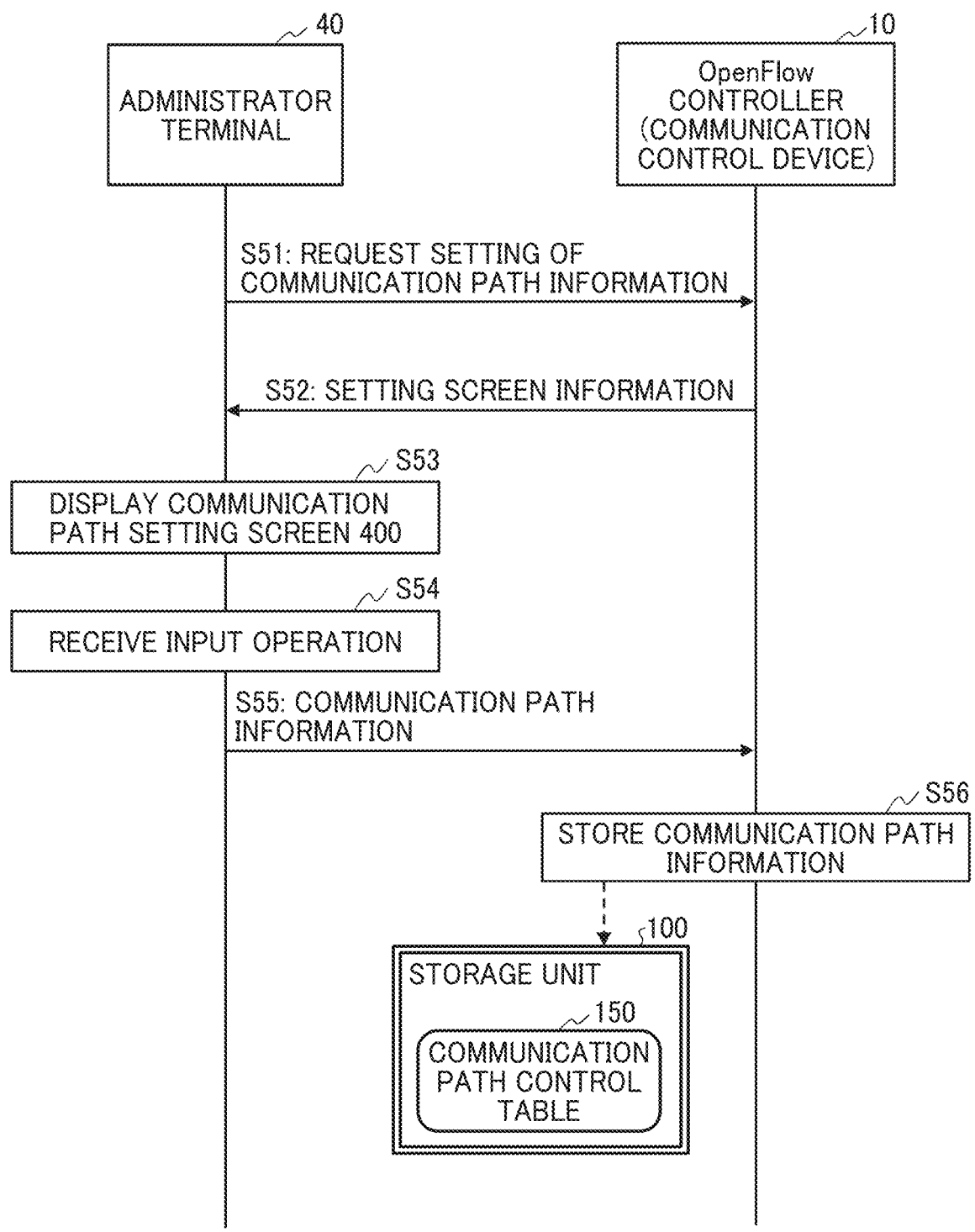
FIG. 11 is an example sequence diagram illustrating setting processing of communication path information in the network system according to the embodiment.

Setting Processing of Communication Path Information:

Hereinafter, a description is given of setting processing of the communication path information controlled or managed by the communication control device 10 with reference to FIGS. 11 and 12. FIG. 11 is an example sequence diagram illustrating the setting processing of the communication path information in the network system 1 according to the embodiment.

In step S51, the transmitting/receiving unit 41 of the administrator terminal 40 transmits a setting start request of the communication path information to the communication control device 10. For example, if the reception unit 42 the administrator terminal 40 receives a user input to a given administrator setting screen displayed on a display of the administrator terminal 40, the transmitting/receiving unit 41 of the administrator terminal 40 transmits the setting start request of the communication path information, and then, the transmitting/receiving unit 11 of the communication control device 10 receives the setting start request transmitted from the administrator terminal 40.

If the transmitting/receiving unit 11 of the communication control device 10 receives the setting start request of the communication path information in step S51, in step S52, the transmitting/receiving unit 11 transmits, to the administrator terminal 40, setting screen information indicating a screen to be used for performing the setting processing of the communication path information. Specifically, if the transmitting/receiving unit 11 receives the setting start request of the communication path information in step S51, the setting unit 14 of the communication control device 10 generates the setting screen information to be displayed using an application, and then, the transmitting/receiving unit 11 of the communication control device 10 transmits the setting screen information, generated by the setting unit 14, to the administrator terminal 40 in step S52.

In step S53, the display control unit 43 of the administrator terminal 40 displays a communication path setting screen 400 (see FIG. 12) on the display (display 206a in FIG. 3) of the administrator terminal 40 based on the setting screen information received by the transmitting/receiving unit 41.

Figure 12:
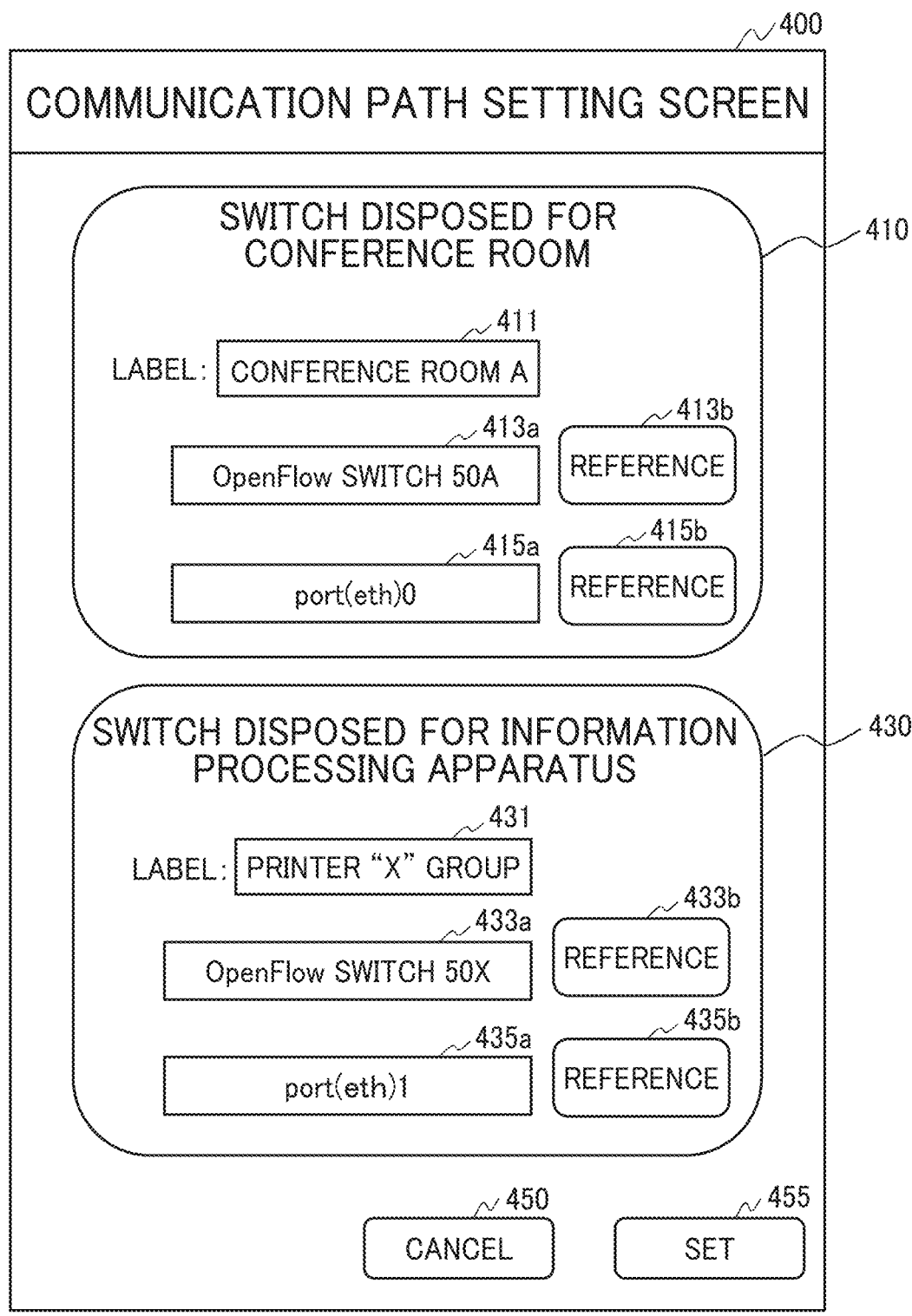
FIG. 12 is an example of a communication path setting screen according to the embodiment.

FIG. 12 is an example of the communication path setting screen 400 according to the embodiment. As illustrated in FIG. 12, the communication path setting screen 400 includes, for example, a transmission source information setting field 410, a forwarding destination information setting field 430, a cancel button 450, and a set button 455.

The transmission source information setting field 410 is used for selecting various information for setting the transmission source information for the OpenFlow switch 50 disposed in the conference room (including the communication terminal 30).

The forwarding destination information setting field 430 is used for selecting various information for setting the forwarding destination information for the OpenFlow switch 50 disposed for the information processing apparatus 90.

The cancel button 450 is to be pressed when the setting processing is cancelled or aborted. The set button 455 is to be pressed when the setting processing is performed.

In step S54, the reception unit 42 of the administrator terminal 40 receives an input to the communication path setting screen 400 (FIG. 12). Specifically, the reception unit 42 receives an input of a name of conference room to be set as the transmission source information into an input field 411 included in the transmission source information setting field 410. Then, if a reference button 413*b* is pressed, the reception unit 42 receives a selection of the OpenFlow switch 50 to be set as the transmission source information. Then, the selected OpenFlow switch 50 is displayed in a display field 413*a*. Then, if a reference button 415*b* is pressed, the reception unit 42 receives a selection of a port number of the OpenFlow switch 50 to be set as the transmission source path information. Then, the selected port number of the OpenFlow switch 50 is displayed in a display field 415*a*.

Similarly, the reception unit 42 receives an input of a name of the information processing apparatus 90 to be set as the forwarding destination information in an input field 431 included in the forwarding destination information setting field 430. Then, if a reference button 433*b* is pressed, the reception unit 42 receives a selection of the OpenFlow switch 50 to be set as the forwarding destination information. Then, the selected OpenFlow switch 50 is displayed in a display field 433*a*. Then, if a reference button 435*b* is pressed, the reception unit 42 receives a selection of a port number of the OpenFlow switch 50 to be set as the transmission destination path information. Then, the selected port number of the OpenFlow switch 50 is displayed in a display field 435*a*.

If the reception unit 42 receives the pressing of the set button 455 in step S54, in step S55, the transmitting/receiving unit 41 of the administrator terminal 40 transmits the communication path information, input on the communication path setting screen 400, to the communication control device 10. The communication path information to be transmitted to the communication control device 10 includes, for example, the transmission source information including the label name, data path ID and port number, and the forwarding destination information including the label name, data path ID and port number. Then, the transmitting/receiving unit 11 of the communication control device 10 receives the communication path information from the administrator terminal 40.

In step S56, the writing/reading unit 15 of the communication control device 10 stores the communication path information, received by the transmitting/receiving unit 11, in the communication path control table 150. The data path ID included in the transmission source information and the forwarding destination information can be set at the administrator terminal 40 based on the information input to the communication path setting screen 400, or the data path ID included in the transmission source information and the forwarding destination information can be set at the communication control device 10 that has received the communication path information from the administrator terminal 40.

Modification of Communication Path Control Table:

Hereinafter, a description is given of a modification or variant example of the communication path control table 150 of FIG. 7 with reference to FIG. 13. As illustrated in FIG. 13, a communication path control table 150*a* of variant example stores the transmission source information including terminal identification information identifying the communication terminal 30 that has transmitted the discovery packet, which is different from the communication path control table 150 of FIG. 7. As illustrated in FIG. 13, the terminal identification information includes, for example, a transmission source terminal name, which is the terminal name of the communication terminal 30, and a media access control (MAC) address set for the transmission source, such as MAC address of the communication terminal 30.

Figure 10:
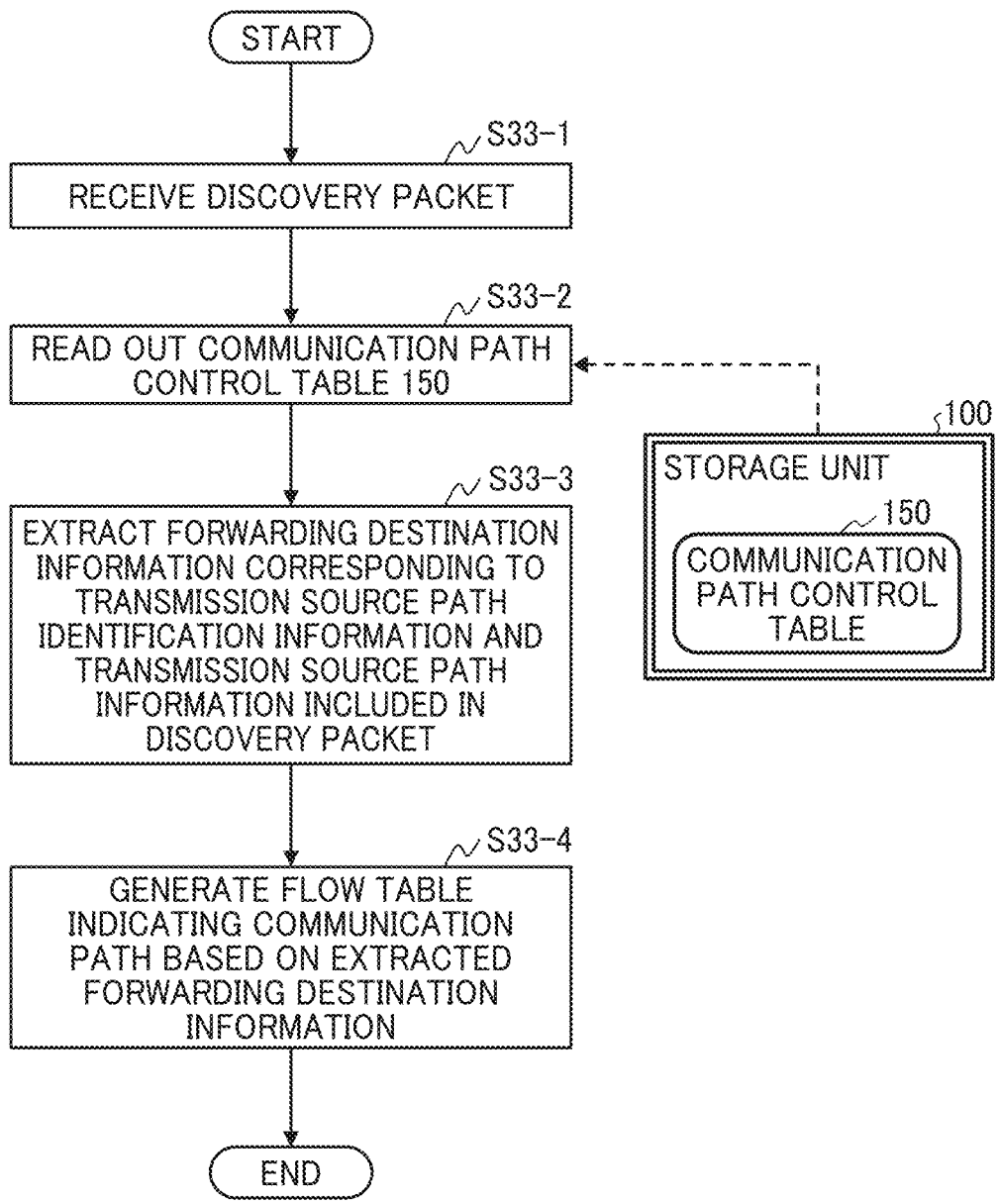
FIG. 10 is an example flowchart illustrating communication path determination processing at a communication control device according to the embodiment.

If the communication path control table 150*a* of FIG. 13 is used in step S33-3 in FIG. 10, the determination unit 12 uses the transmission source path identification information, the transmission source path information, and the terminal identification information included in the discovery packet, received by the transmitting/receiving unit 11, as the search key to extract the forwarding destination information associated with the corresponding transmission source path identification information, the corresponding transmission source path information, and the corresponding terminal identification information included in the communication path control table 150*a*. With this configuration, the communication control device 10 can determine the forwarding destination of the discovery packet based on the space-based network node where the OpenFlow switch 50 disposed for the transmission source of the discovery packet exists, and also the communication terminal 30 that has transmitted the discovery packet, with which the communication control device 10 can transfer or forward the discovery packet to the forwarding destination, which becomes different depending on the communication terminal 30 that has transmitted the discovery packet.

As above described, the network system 1 includes the communication terminal 30, the information processing apparatus 90, at least one OpenFlow switch 50 (an example of the first switch), at least another one OpenFlow switch 50 (an example of the second switch), and the communication control device 10, in which a specific information processing apparatus 90 becomes the connection destination of a specific communication terminal 30. The one OpenFlow switch 50 (an example of the first switch) is used to connect the specific communication terminal 30 to the communication network 5. The another one OpenFlow switch 50 (an example of the second switch) is used to connect the specific information processing apparatus 90 (i.e., connection destination of the specific communication terminal 30) to the communication network 5. The communication control device 10 controls the communication between the specific communication terminal 30 and the specific information processing apparatus 90 via the one OpenFlow switch 50 (an example of the first switch) and another one OpenFlow switch (an example of the second switch).

Further, the communication control device 10 receives the discovery packet (an example of the response request to the specific information processing apparatus 90) transmitted from the specific communication terminal 30, and the communication control device 10 determines a specific second switch specified or identified by specific forwarding destination information associated with specific transmission source information specifying or identifying a specific first switch that has transmitted the discovery packet, as the forwarding destination of the discovery packet, based on the communication path information (an example of the communication path control table 150) associating the transmission source information specifying or identifying each of the first switches, and forwarding destination information specifying or identifying each of the second switches. Then, the communication control device 10 transfers the discovery packet to the determined specific second switch.

Further, the specific communication terminal 30 transmits the discovery packet as the response request to the specific information processing apparatus 90 and then receives the response (return response) with respect to the discovery packet transmitted from the specific information processing apparatus 90 connected to the specific second switch determined by the communication control device 10.

With this configuration, as to the network system 1, the specific second switch to become the forwarding destination of the discovery packet can be determined based on the communication path information, which defines the transfer rule of the discovery packet, with which the specific information processing apparatus 90 alone can be found or detected for the discovery packet transmitted from the specific communication terminal 30.

Further, as to the communication control device 10, the transmission source information includes the transmission source path information identifying the specific communication port of the specific first switch that receives the discovery packet (an example of the response request to the specific information processing apparatus 90) transmitted from the specific communication terminal 30, and the forwarding destination information includes the forwarding destination path information identifying the specific communication port of the specific second switch that transmits the discovery packet.

Then, the communication control device 10 determines the specific communication port of the specific second switch identified by the specific forwarding destination path information, associated with the specific transmission source path information identifying the specific communication port of the specific first switch that has received the discovery packet from the specific communication terminal 30, as the forwarding destination of the discovery packet. With this configuration, the communication control device 10 can determine the specific communication port of the specific second switch to be used as the forwarding destination of the discovery packet based on the communication path information, which defines the transfer rule of the discovery packet, with which the communication control device 10 can transfer the discovery packet in a way that the discovery packet is transmitted to the specific information processing apparatus 90 alone.

Further, as to the communication control device 10, the transmission source path information is the TCP port number set for the communication port of the first switch, and the forwarding destination path information is the TCP port number set for the communication port of the second switch. Thus, the communication control device 10 can determine the forwarding destination of the discovery packet in accordance with the communication protocol of the transmission source of the discovery packet and the communication protocol of the forwarding destination of the discovery packet.

Further, as to the communication control device 10, the transmission source information includes the terminal identification information identifying the specific communication terminal 30 that has transmitted the discovery packet (an example of the response request to the specific information processing apparatus 90). Then, the communication control device 10 determines the specific second switch, which is identified by specific transmission destination information associated with specific terminal identification information of the specific communication terminal 30 that has transmitted the discovery packet, as the forwarding destination of the discovery packet, in which the specific transmission destination information is included in the communication path information (an example of the communication path control table 150). With this configuration, the communication control device 10 can determine the forwarding destination of the discovery packet based on the space-based network node where the OpenFlow switch 50 of the transmission source of the discovery packet exists, and the communication terminal 30 that has transmitted the discovery packet, with which the communication control device 10 can transfer or forward the discovery packet to the forwarding destination, which becomes different depending on the specific communication terminal 30 that has transmitted the discovery packet.

According to the above described embodiment, when the communication terminal transmits the response request to all of information processing apparatuses connected to the network that the communication terminal is connected, a specific information processing apparatus alone can be found or detected among the information processing apparatuses connected to the network.

The functions of each of the above described embodiments can be implemented by computer executable programs written in legacy programming languages and object-oriented programming languages, such as assembler, C, C++, C #, Java (registered trademark), etc., and the programs for performing the functions of each of the above described embodiments can be distributed through the electronic communication line.

Further, the programs for performing the functions of each of the above described embodiments can also be stored in a computer-readable recording medium such as ROM, electrically erasable programmable read-only memory (EEPROM), erasable programmable read-only memory (EPROM), flash memory, flexible disk, compact disc ROM (CD-ROM), compact disc-rewritable (CD-RW), digital versatile disk (DVD)-ROM, DVD-RAM, DVD-RW, Blu-Ray disc, secure digital (SD) card, magneto-optical disc (MO), and the like.

Further, some or all of the functions of each of the above described embodiments can be implemented on a programmable device (PD) such as field programmable gate array (FPGA) or can be implemented as an application specific integrated circuit (ASIC), and can be distributed using a recording medium as data described by hardware description language (HDL), very-high speed integrated circuits hardware description language (VHDL) and Verilog HDL, which can be downloaded to the PD to implement the functions of each of the embodiments on the PD.

Although the network system, the communication control device, the communication control method, and the program according to the embodiment of the present invention have been described, the present invention is not limited to the above-described embodiments, but it may be changed within the scope to be implemented by one skilled in the art, such as addition, modification or deletion of other embodiments, and it may be changed within the scope of the present invention insofar as it is possible to implement the effects and effects of the present invention in one or more aspects of the invention.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A network system including one or more communication terminals and one or more information processing apparatuses connectable with the one or more communication terminals via a communication network, the network system comprising:
   one or more first switches for connecting the one or more communication terminals configured to transmit a response request to the communication network;
   one or more second switches for connecting the one or more information processing apparatuses to the communication network; and
   a communication control device configured to control communication between the one or more communication terminals and the one or more information processing apparatuses via the one or more first switches and the one or more second switches, the communication control device including processing circuitry configured to
      receive, from a specific communication terminal via a specific first switch, a specific response request to be transmitted to a specific information processing apparatus;
      determine, based on communication path information associating transmission source information identifying the one or more first switches and forwarding destination information identifying the one or more second switches, a specific switch identified by specific forwarding destination information associated with specific transmission source information identifying the specific first switch that has transmitted the specific response request to the communication control device, as a forwarding destination of the specific response request; and
      transfer the specific response request to the determined specific second switch connected to the specific information processing apparatus,
   wherein the specific communication terminal, which has transmitted the specific response request to the communication network via the specific first switch, is configured to receive a return response with respect to the specific response request from the specific information processing apparatus via the specific second switch and the specific first switch.

2. The network system of claim 1,
   wherein the transmission source information includes transmission source path information identifying a communication port of the one or more first switches that receive the response request transmitted from the one or more communication terminals, in which specific transmission source path information identifying a specific communication port of the specific first switch is included,
   wherein the forwarding destination information includes transmission destination path information identifying a communication port of the one or more second switches that transmit the response request, received from the communication control device, to the one or more information processing apparatuses, in which specific transmission destination path information identifying a specific communication port of the specific second switch is included,
   wherein the communication control device determines the specific communication port of the specific second switch that is identified by the specific transmission destination path information associated with the specific transmission source path information identifying the specific communication port of the specific first switch that has received the specific response request from the specific communication terminal, as the forwarding destination.

3. The network system according to claim 2,
   wherein the transmission source path information is a transmission control protocol (TCP) port number set for the communication port of the one or more first switches, and the transmission destination path information is a TCP port number set for the communication port of the one or more second switches.

4. The network system according to claim 1,
   wherein the transmission source information includes specific terminal identification information identifying the specific communication terminal that has transmitted the specific response request, and the forwarding destination information includes specific transmission destination information identifying the specific second switch,
   wherein the communication control device determines the specific second switch that is identified by the specific transmission destination information associated with the specific terminal identification information of the specific communication terminal that has transmitted the specific response request, as the forwarding destination, the specific transmission destination information is included in the communication path information.

5. The network system according to claim 1, further comprising a memory configured to store the communication path information,
   wherein the communication control device stores, in the memory, the communication path information that is generated by executing an application installed on the communication control device.

6. The network system according to claim 1,
   wherein each of the one or more first switches and the one or more second switches employs an OpenFlow switch used in OpenFlow switching technology, and the communication control device employs an OpenFlow controller used in the OpenFlow switching technology.

7. The network system according to claim 6,
   wherein the communication control device generates a flow table used in the OpenFlow switching technology based on the determined forwarding destination, and transfers the specific response request based on the generated flow table.

8. The network system according to claim 1,
   wherein the response request is a discovery packet compatible to a neighbor discovery protocol broadcast-able from the one or more communication terminals.

9. A communication control device for controlling communication between one or more communication terminals and one or more information processing apparatuses connectable with each other via a communication network including one or more first switches for connecting the one or more communication terminals to the communication network and one or more second switches for connecting the one or more information processing apparatuses to the communication network, the communication control device comprising:

circuitry configured to receive, from a specific communication terminal via a specific first switch, a specific response request to be transmitted to a specific information processing apparatus;

determine, based on communication path information associating transmission source information identifying the one or more first switches and forwarding destination information identifying the one or more second switches, a specific second switch identified by specific forwarding destination information associated with specific transmission source information identifying the specific first switch that has transmitted the specific response request to the communication control device, as a forwarding destination of the specific response request; and transfer the specific response request to the determined specific second switch connected to the specific information processing apparatus.

10. A method of controlling communication between one or more communication terminals and one or more information processing apparatuses connectable with each other via a communication network including one or more first switches for connecting the one or more communication terminals to the communication network and one or more second switches for connecting the one or more information processing apparatuses to the communication network, the method comprising:

receiving, from a specific communication terminal via a specific first switch, a specific response request to be transmitted to a specific information processing apparatus;

determining, based on communication path information associating transmission source information identifying the one or more first switches and forwarding destination information identifying the one or more second switches, a specific second switch identified by specific forwarding destination information associated with specific transmission source information identifying the specific first switch that has transmitted the specific response request, as a forwarding destination of the specific response request; and transferring the specific response request to the determined specific second switch connected to the specific information processing apparatus.

* * * * *